UNITED STATES PATENT OFFICE.

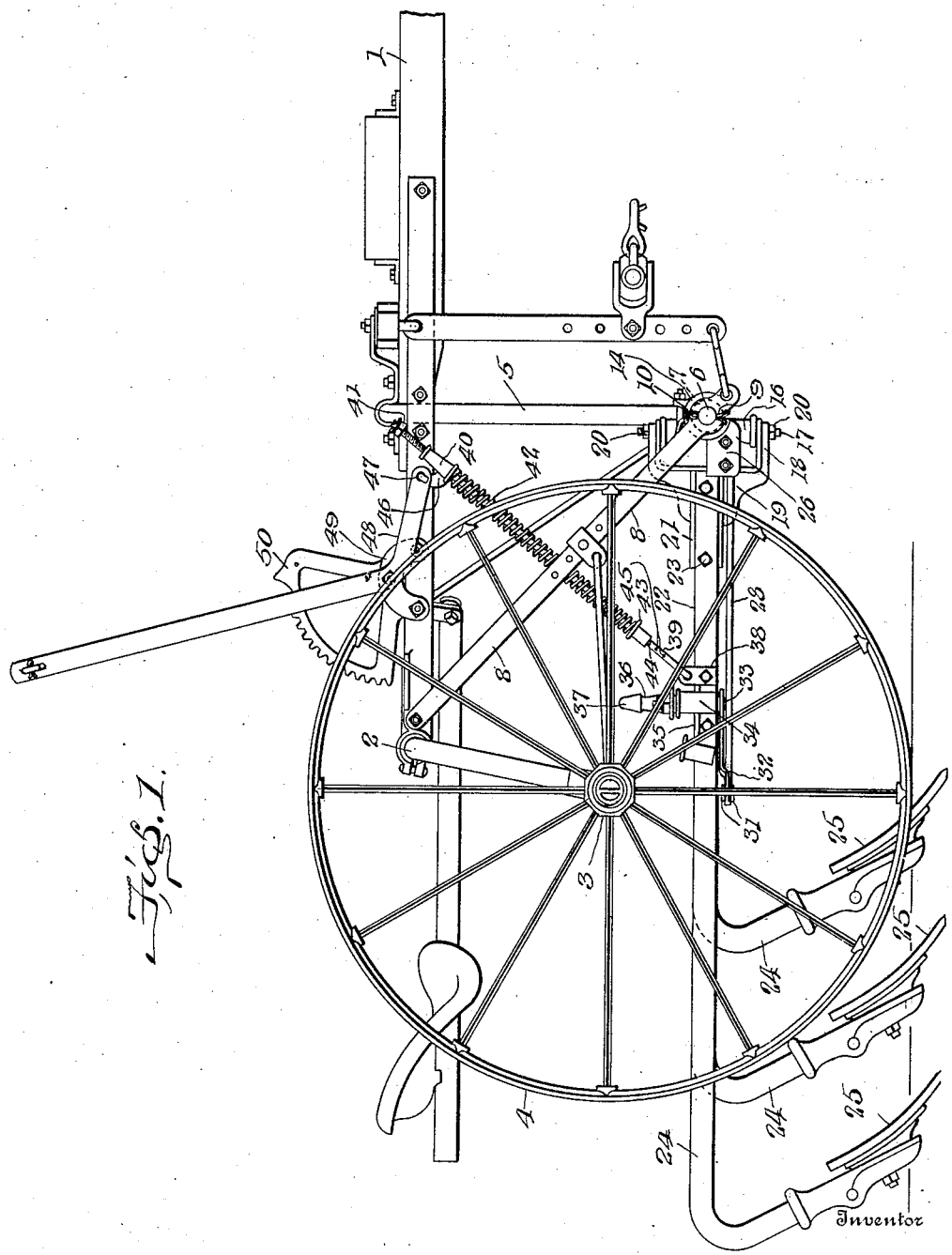

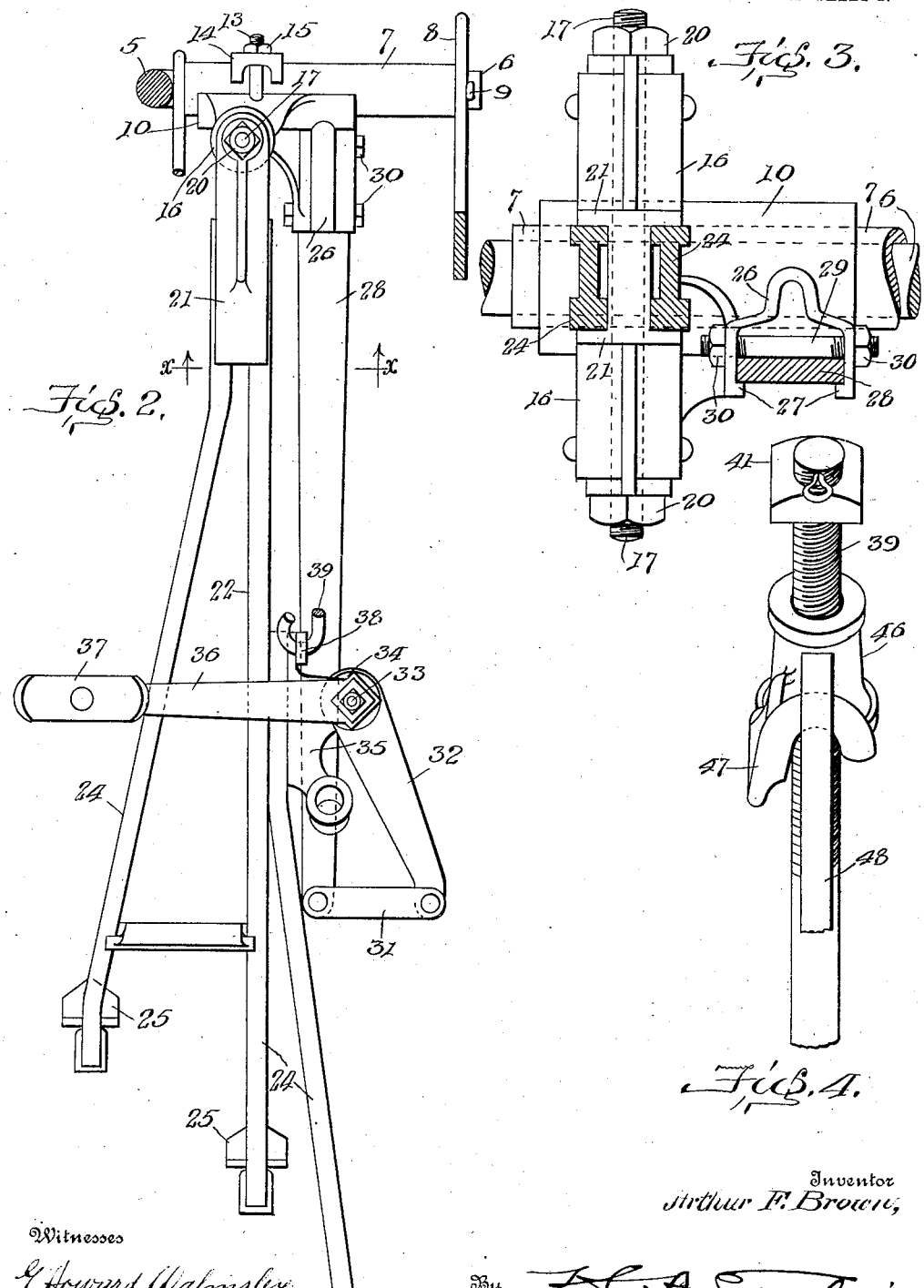

ARTHUR F. BROWN, OF SPRINGFIELD, OHIO, ASSIGNOR TO P. P. MAST AND COMPANY, OF SPRINGFIELD, OHIO, A CORPORATION OF OHIO.

WHEEL-CULTIVATOR.

No. 874,566.

Specification of Letters Patent.

Patented Dec. 24, 1907.

Application filed January 30, 1907. Serial No. 354,838.

*To all whom it may concern:*

Be it known that I, ARTHUR F. BROWN, a citizen of the United States, residing at Springfield, in the county of Clark and State of Ohio, have invented certain new and useful Improvements in Wheel-Cultivators, of which the following is a specification, reference being had therein to the accompanying drawings.
The present invention relates to improvements in wheel cultivators of that type in which the gangs are adapted to be moved in a direction transverse to the line of travel of the cultivator in order to adjust their position relatively to the plants being cultivated. In this class of cultivators it is customary to pivotally connect the gang beam at its forward end with some part of the frame of the cultivator so that it is free to move transversely of the frame. At a point in the rear of this pivotal connection a supporting member is provided which extends from the gang beam to some part of the frame above the same. The beam is also provided with means for moving the same laterally, which means is usually in the form of a foot lever, connected to the frame and to the beam in such a manner as to move the beam relatively to the frame, but the arrangement is such that it provides a foot leverage which is short, has little power and renders the operation of the shifting means difficult and uncertain. The supporting means for the beam in the ordinary construction is such as cause the beam to travel in an arc of a circle having for its center that part of the frame to which the supporting means is connected, thus causing the hoes carried by the beam to vary their positions relatively to the surface of the ground as the beam is moved transversely of the frame of the cultivator, thereby diminishing their effect on the soil, and, if they are moved to any considerable distance from the central position, causing them to move entirely out of engagement with the soil.

The object of the present invention is to overcome these difficulties and to provide a cultivator of this character in which the shifting mechanism for the gang beam will be easy and certain of operation and in which the supporting mechanism will be of such a construction that the gang beam and the hoes carried thereby will move substantially in a horizontal plane.
With these objects in view the present invention consists in certain novel features of construction hereinafter to be described, and then more fully pointed out in the claims.

In the accompanying drawings, Figure 1 is a side elevation of a cultivator embodying my invention; Fig. 2 is a top plan view of one of the gangs of such a cultivator; Fig. 3 is a sectional view, taken on the line $x\ x$ of Fig. 2 and looking in the direction of the arrows;
and Fig. 4 is a detail view of the sleeve and hook for the supporting rod.

In these drawings I have illustrated the preferred embodiment of my invention in which 1 indicates the frame of the machine as a whole. This frame is provided near the rear thereof with an axle frame 2 which is preferably in the form of a yoke or arch connected at its upper portion to the frame 1 and provided at its lower end portions with axles 3, on which are mounted the wheels 4. A gang yoke or arch 5 is mounted on the frame 1 some distance forward of the axle frame 2 and is of similar construction thereto having its lower or end portions provided with axles 6 upon which are journaled sleeves 7 retained thereon in any suitable manner, that herein shown consisting in placing the apertured lower end of a brace rod 8 over the lower end of the axle 6 and securing the same in position thereon by a split key 9. The brace rod engages the outer end of the sleeve 7 and holds the same against longitudinal movement on the axle 6, but allows the same to rotate freely thereon. A bracket 10 is rigidly secured to the sleeve 7 in any suitable manner, that shown in the drawing consisting in shaping the contacting surface of the bracket 10 to conform to the contour of the sleeve 7, and providing it with bolts 13 adapted to extend on opposite sides of the sleeve 7 and engage the clip 14. The bolts 13 are provided with suitable nuts 15 for clamping the clip securely against the sleeve 7 and permitting the bracket to be adjusted longitudinally thereof. The bracket 10 is provided with a suitable vertical bearing 16, in which is mounted a pivot pin 17 extending beyond the same at either end thereof and adapted to engage the apertured ends of the arms 18 of the bracket 19 which are adapted to receive the vertical bearing 16 between said ends. The pivot pin 17 is provided with suitable nuts 20 for retaining the same in its proper position. The bracket 19 is provided with a suitable seat or socket 21, in which is rigidly secured the gang beam 22 by means of bolts 23 or other suitable means.

The gang beam preferably consists of two or more arms 24 provided at their lower ends with suitable cultivating hoes 25. The bracket 10 is provided with a second socket 26, extending substantially parallel with the socket 21 and preferably in the form of a substantially U-shaped socket or clamp of slightly resilient metal, preferably a malleable casting which is provided near its lower edges with suitable lugs or projections 27 adapted to support the inner end of an arm 28 which is inserted between the walls of the clamp 26 and is rigidly secured therein by means of a bolt 29 extending through the walls of the clamp 26 and provided with suitable nuts 30. The arm 28 extends rearwardly substantially parallel with the gang beam 22 to a point substantially even with the axle 3 supporting the ground wheels 4. Near its rear end the arm 28 is pivotally connected to the link 31, to the opposite end of which is pivotally connected an arm 32 having its opposite end rigidly secured to the lower end of a rockshaft 33, journaled in a bearing lug 34, formed on a bracket 35 which is rigidly secured to the gang beam 22. To the upper end of the rockshaft 33 is rigidly secured a second arm 36 having at its outer end a foot piece 37. The bracket 35 is also provided with an upwardly extending apertured lug 38, adapted to be engaged by the lower end of a supporting member or rod 39 which extends upwardly and forwardly so that its upper end lies in substantially the same vertical plane with the vertical bearing 16. A sleeve 40 is slidably mounted on the rod 39 near its upper end and the movement of the same is limited in one direction by a nut 41 and in the opposite direction by a spring 42 coiled about the rod 39 and having its upper end adapted to engage the sleeve 40 and its lower end adapted to engage the flanged collar 43, which is supported on the rod 39 by a suitable pin 44 engaging one of the series of apertures 45 formed in the rod 39, whereby the tension of the spring may be varied. The sleeve 40 is provided with an arm or lug 46 having a hook 47 adapted to engage the apertured end of a bell crank lever 48 which is pivotally supported on a bracket 49 which is secured to the frame 1 at a point intermediate the axle frame 2 and the gang arch 5. The upper end of the bell crank lever 48 serves as an operating lever for moving the same about its pivotal connection and thereby altering the position of the gang beam 22. The upper end of the lever 48 is also provided with the usual detent mechanism which is not shown, but is adapted to engage the toothed segment 50 carried by the bracket 49 and adapted to retain the supporting rod in its adjustable position.

From the foregoing description it will be obvious that by supporting the gang beam in the manner described, that is, by providing the same with a supporting member connected to the frame in substantially the same vertical plane as the pivotal connection of said gang beam, that the same will be permitted to move in substantially a horizontal plane, the amount of variation from this plane, if any, corresponding only to the distance which the upper end of the supporting rod may be removed from the vertical plane of the pivotal center of said gang beam, which is very slight. It will be further observed that the shifting lever, by means of which the gang is moved in the horizontal direction, being fulcrumed at a point close to the gang beam, affords a long leverage and an easy and certain shifting mechanism for the gangs. It will also be obvious that the shifting lever may consist of a single bell crank lever instead of having the interposed rock arm, as herein described.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a wheel cultivator, the combination, with a frame, a gang beam supported from said frame and capable of movement in a direction transverse to the line of travel of said cultivator, and means for moving said gang beam, of a member carried by said frame, fixed against lateral movement and having one end adjacent to said gang beam and adapted to form a support for the means for moving said beam, substantially as described.

2. In a wheel cultivator, the combination, with a frame, a gang beam supported from said frame and capable of movement in a direction transverse to the line of travel of said cultivator, and a lever for moving said gang beam, of a member carried by said frame, fixed against lateral movement and having one end adjacent to said gang beam and adapted to form a fulcrum for said lever, substantially as described.

3. In a wheel cultivator, the combination, with a frame, a gang beam pivotally connected to said frame, and an arm supported from said frame adjacent to said gang beam extending substantially parallel therewith and fixed against lateral movement, of a lever fulcrumed near one end of said arm and connected to said gang beam.

4. In a wheel cultivator, the combination, with a frame, a gang beam supported from said frame and capable of longitudinal and vertical movement relatively thereto, and an arm supported from said frame and extending substantially parallel with said gang beam, said arm being capable of a vertical movement relatively to said frame and fixed against lateral movement, of a lever fulcrumed near one end of said arm and connected with said gang beam, substantially as described.

5. In a wheel cultivator, the combination, with a frame, a gang beam pivotally supported therefrom and capable of horizontal and vertical movement relatively thereto, and an arm supported from said frame and capable of a vertical movement relatively thereto and fixed against horizontal movement, of a lever fulcrumed near the outer end of said arm and connected with said gang beam, substantially as described.

6. In a wheel cultivator, the combination, with a frame, an axle supported therefrom, a gang beam journaled on said axle and capable of a horizontal movement relatively to said frame, and an arm supported from said frame extending substantially parallel with said gang beam, of a lever fulcrumed near one end of said arm and connected with said gang beam, substantially as described.

7. In a wheel cultivator, the combination, with a frame, an axle supported thereby, a bearing mounted on said axle, a gang beam pivotally mounted on said bearing, and an arm rigidly secured to said bearing, of a lever fulcrumed near the outer end of said arm and connected to said gang beam, substantially as described.

8. In a wheel cultivator, the combination, with a frame, an axle carried thereby, a bearing mounted on said axle, a second bearing carried by said first-mentioned bearing and extending at an angle thereto, a gang beam mounted on said second bearing, an arm rigidly secured to said first-mentioned bearing and extending substantially parallel to said gang beam, of a lever fulcrumed near the outer end of said arm and connected with said gang beam, substantially as described.

9. In a wheel cultivator, the combination, with a frame, an axle carried thereby, a sleeve mounted on said axle, a bracket rigidly secured to said sleeve, a bearing carried by said bracket and extending at an angle to said axle, a gang beam mounted on said bearing, an arm carried by said bracket and extending parallel to said gang beam, of a lever fulcrumed near the end of said arm and connected to said gang beam, substantially as described.

10. In a wheel cultivator, the combination, with a frame, an axle carried thereby, a sleeve journaled on said axle, a bracket having a curved surface adapted to fit over said sleeve, means for securing said bracket to said sleeve, a vertical bearing secured to said bracket, a pivot pin mounted in said bearing, a bifurcated gang beam having apertured arms adapted to extend on opposite ends of said bearing and engage said pivot pin, of an arm rigidly secured to said bracket and extending substantially parallel with said gang beam, and a lever fulcrumed near the end of said arm and connected to said gang beam, substantially as described.

11. In a wheel cultivator, the combination, with a frame, an axle carried thereby, a bearing journaled on said axle, a gang beam pivotally mounted on said bearing, an arm mounted on said bearing and extending substantially parallel to said gang beam, of a link pivoted near the end of said arm, a lever pivoted to the opposite end of said link and connected to said gang beam, and means for operating said levers, substantially as described.

12. In a wheel cultivator, the combination, with a frame, an axle carried thereby, a bearing journaled on said axle, an arm rigidly secured to said bearing and extending substantially parallel to the gang beam, of a link pivotally connected near the end of said arm, a lever pivotally connected to the opposite end of said link, a rockshaft journaled on said gang beam and having said lever rigidly secured to one end thereof, and an arm secured to the opposite end of said rockshaft, substantially as described.

13. In a wheel cultivator, the combination, with a frame, an axle carried thereby, a bearing mounted on said axle, a gang beam pivotally mounted on said bearing, a bracket carried by said gang beam, a rockshaft journaled on said bracket, of an arm rigidly secured to said bearing and extending substantially parallel with said gang beam, a lever rigidly secured to one end of said rockshaft, a link pivotally connecting said lever with one end of said arm, and means for actuating said rockshaft, substantially as described.

14. In a wheel cultivator, the combination, with a frame, a gang beam pivotally supported therefrom, of a lever pivotally mounted on said frame and having one end extending substantially into the plane of the pivotal center of said gang beam, and a rod connected at one end to said gang beam, of a sleeve mounted on the opposite end of said rod and connected with the end of said lever, and means for limiting the movement of said sleeve on said rod, substantially as described.

15. In a wheel cultivator, the combination, with a frame, and a gang beam pivotally supported therefrom, of a lever pivotally mounted on said frame, a rod connected to said gang beam, a sleeve mounted on said rod and connected to the end of said lever, a collar mounted on said rod, a coiled spring confined between said collar and said sleeve, and means for retaining said sleeve on said rod, substantially as described.

16. In a wheel cultivator, the combination, with a main frame, an axle frame carried by said main frame, and a gang arch supported by said main frame in front of said axle frame, and a gang beam pivotally supported from said gang arch, of a lever pivotally mounted on said frame between said axle frame and said gang arch and having one end lying in substantially the same vertical plane as the pivotal center of said beam, a rod connecting the said end of said lever with said gang beam, a stop fixed to said rod, a spring coiled about said rod and engaging said stop, and means controlled by said lever for regulating the tension of said spring, substantially as described.

17. In a wheel cultivator, the combination, with a frame, and a gang beam pivotally mounted thereon, of a lever mounted on said frame, and having one end extending into substantially the same vertical plane as the pivotal center of said beam, a rod having one end connected to said gang beam, a sleeve mounted on said rod, a hook cast integral with said sleeve and adapted to engage said lever, and means for limiting the movement of said sleeve on said rod, substantially as described.

18. In a wheel cultivator, the combination, with a frame, an axle supported thereby, a bracket journaled on said axle, and a gang beam pivotally mounted on said bracket, of a substantially U-shaped member carried by said bracket, an arm adapted to enter said U-shaped member, and means for clamping said arm between the sides of said U-shaped member, of a lever pivoted near the end of said arm and connected to said gang beam, substantially as described.

In testimony whereof I affix my signature in presence of two witnesses.

ARTHUR F. BROWN.

Witnesses:
  E. O. HAGAN,
  HARRIET L. HAMMAKER.